Jan 6, 1931. H. E. WILLIAMS 1,787,846
VEHICLE AWNING
Filed Aug. 13, 1927   2 Sheets-Sheet 1
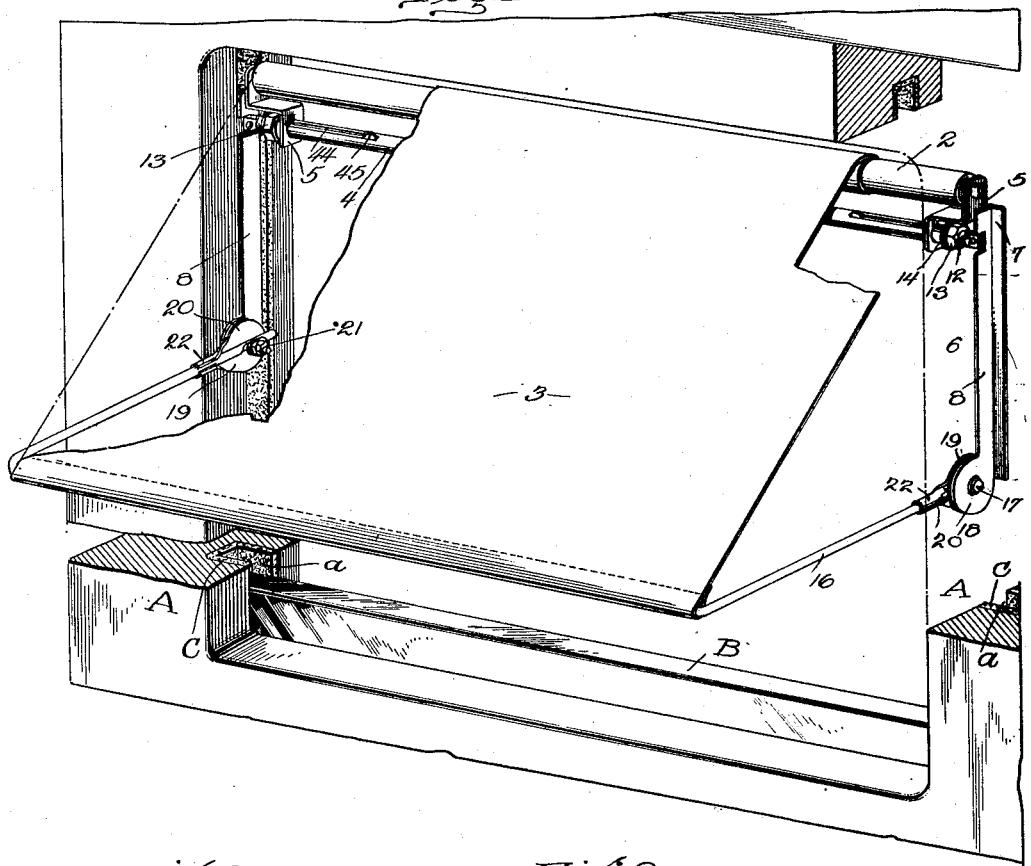
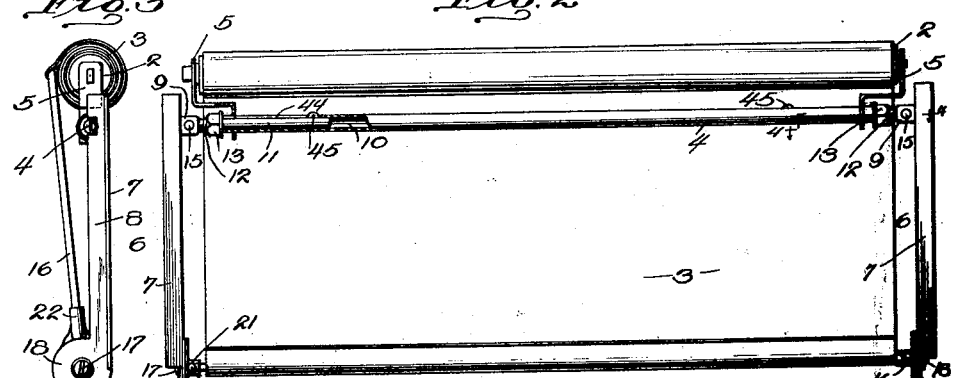
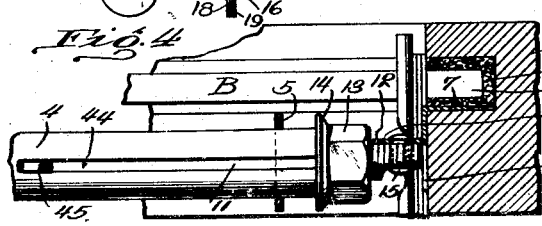

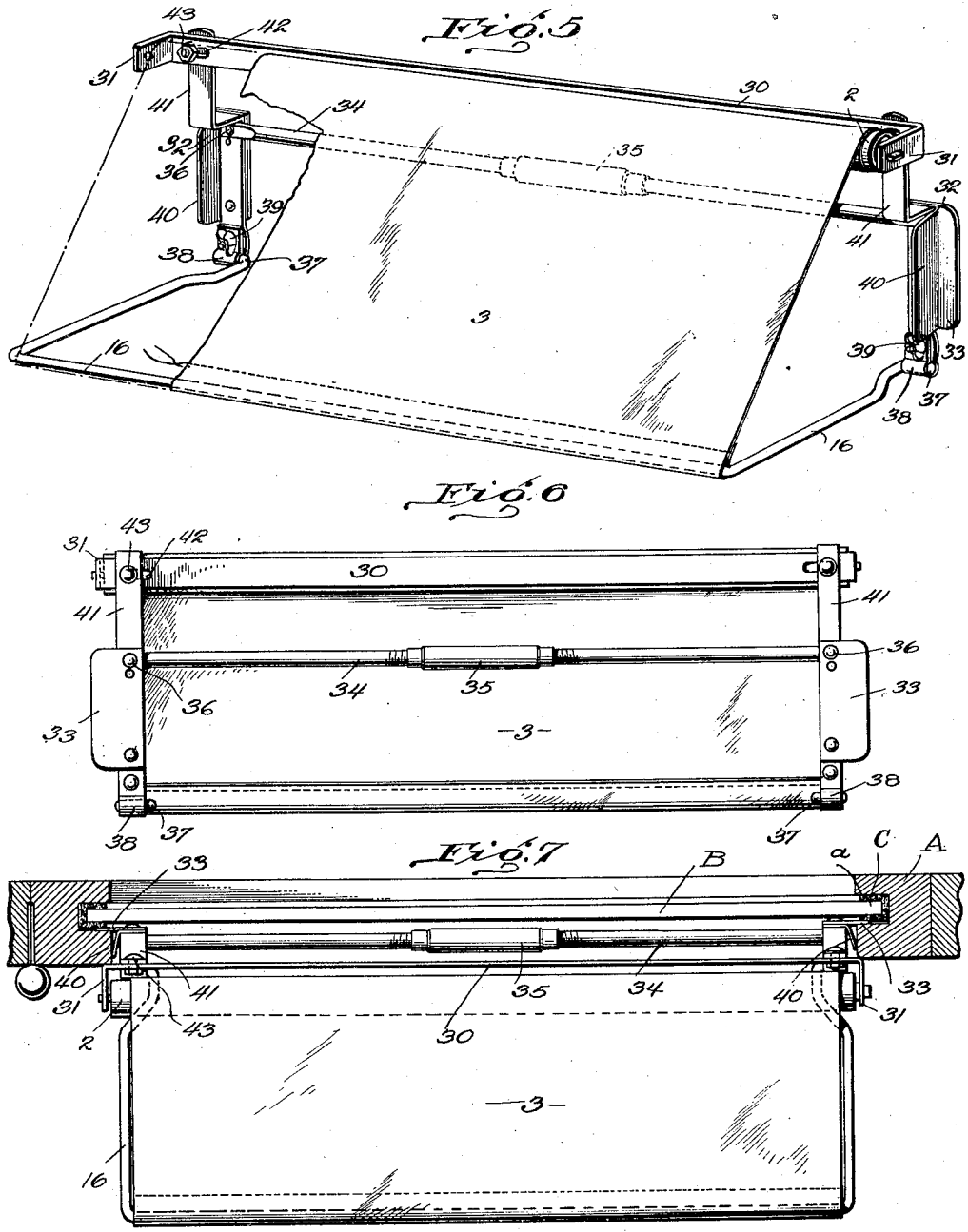

Patented Jan. 6, 1931

1,787,846

UNITED STATES PATENT OFFICE

HAROLD E. WILLIAMS, OF CARTHAGE, MISSOURI

VEHICLE AWNING

Application filed August 13, 1927. Serial No. 212,741.

This invention relates to shades or awnings such as are particularly adapted for use on automobiles or other vehicles, though it is not limited in its useful applications to such uses. The invention is illustrated in two forms in the accompanying drawings, and will be understood from the following description.

Fig. 1 is a perspective view of one form of awning embodying my invention, parts being broken away and the awning being open or extended.

Fig. 2 is a rear view of the awning shown in Fig. 1.

Fig. 3 is an edge view with the awning rolled up or closed.

Fig. 4 is a horizontal sectional view on the line 4—4 of Fig. 2.

Fig. 5 is a perspective view of another form of awning embodying my invention, parts being broken away and the awning being open or extended.

Fig. 6 is a rear view of the awning shown in Fig. 5, and

Fig. 7 is a top plan view.

Referring to the drawings, 2 indicates a roller upon which is supported a flexible awning or shade 3. The roller is preferably of the spring-actuated type such as is in common use. It is supported in a frame that is fixed or non-extensible as to its length. As represented in Figs. 1, 2, and 3 this frame comprises a bar 4 carrying supporting brackets 5 near its ends in which is mounted the roller 2. One or both of the brackets may be elastic to permit the roller pivots to be forced into the seats provided therefor in the brackets, and there held by the resiliency of the brackets.

The roller frame is connected with a supporting frame that is adapted to be set into the runways $a$ for the glass B of a window of an automobile. This frame consists of duplicate angle pieces 6, 6, at the ends of the awning frame. The outwardly extending flanges 7 of the angle pieces 6 are adapted to enter the runways $a$ formed in the frame A, between the lining C of felt or other suitable material for the window glass and an adjacent wall of the runway, as represented in Fig. 4; where it is held, supporting the awning, without interfering with the movements of the window glass or of the roller 2. Of course, if a lining such as C is not employed, the flange 7 lies directly between the wall of the groove or runway $a$ and the face of the glass B.

8 indicates the outwardly or forwardly extending exposed portion of the frame piece 6, it being preferably arranged at right angles to the flange 7.

The angular frame pieces 6 are movable laterally, being preferably pivotally connected with the roller-carrying frame. This permits the supporting pieces to be moved apart in order that they may be forced into the glass runways $a$ and into clamping engagement with the side faces of the framework A, in order to securely hold the awning in the desired position. To effect this, I have devised the following arrangements of parts and illustrated them in Figs. 1 to 4 inclusive.

The bar 4 of the roller frame is tubular, at least towards its ends, as indicated at 10, and into these tubular portions of the bar extends studs 11, these being freely movable relative to the bar. The studs are screw-threaded as at 12, and with them engage the nuts 13. Washers 14 are preferably interposed between the nuts and the ends of the bar 4. The outer ends of the studs are preforated to receive pivots 15 connecting them with the frame pieces 6, the pivots extending through brackets 9 formed by cutting the exposed portion 8 of the framepiece and bending it relative to the part 8 as clearly represented on the drawings.

The studs or short rods 11 are provided with teats or projections 45 that are adapted to move in the slots 44 formed in the bar or rod 4, this arrangement serving to prevent rotation of the studs or rods 11 in the rod 4 when the nuts 13 are turned.

It will be understood that if the nuts are turned so as to force the washers 14 against the ends of the bar 4 the studs 11 will be moved outwardly, since the bar is rigid lengthwise, and such movements of the studs force the angular supporting frame pieces 6 outwardly and, if they are properly positioned relative to the window frame A, into holding engagement with the latter. A reverse movement of the nuts upon the studs permits the frame pieces 6 to approach each other and thus release the awning from the window frame.

16 indicates a pivoted stretcher frame having an intermediate cross bar that occupies a position parallel with the roller 2 and to which the free edge of the awning is secured. This stretcher frame is united to the frame pieces 6 by pivots 17. The exposed portions 8 of the frame pieces 6 are, at their lower ends, formed with circular enlargements 18 through which pivots 17 pass. 19 indicates plates that lie opposite the enlargements 18. They are provided each with an arm 22 adapted to encircle a side arm of the stretcher frame near its pivoted end so that the plate turns with the frame. A friction pad 20 lies between the bracket 18 and the plate 19. A nut 21 upon the pivot 17 serves to hold the plates 18 and 19 towards each other so as to clamp the friction pad 20 between them.

The stretcher frame 16 is resilient—that is the outer ends of its side arms tend to move apart to a distance greater than that between the opposite glass runs a, into which the awning supporting frame is to be set. This resiliency of the stretcher frame is of assistance in setting the awning into position.

The operation of placing the awning is as follows: The nuts 13 are adjusted to such positions as permit the studs 11 to be pushed into the tubular portions of the rod 4 sufficiently to allow the upper portions of the flanges 7 to be inserted into the glass runs a. The lower ends of these flanges may be moved so as to enter the glass runs due to the resiliency of the stretcher frame 16, as has been described. The flanges 7 having been set into the glass runs, the nuts 13 are adjusted to move the studs 11 outwardly until the exposed portions 8 of the angular frame pieces are forced tightly against the sides of the window opening. This adjustment of the holding frame pieces in no wise interferes with the mounting and operations of the roller carrying the awning. The awning frame being secured as described, the awning 3 may be extended by swinging the stretcher frame upon its pivots 17 to carry the cross bar of the stretcher frame downwardly away from the roller 2, pulling the awning with it and causing it to unroll. The roller being spring-actuated holds the awning taut and insures that it shall roll tightly upon the roller as the frame 16 is moved to its closing position.

In Figs. 5 to 7 is shown a form of the invention having many features in common with the awning shown in the other views but differing therefrom in some details of construction. Referring to these views, it will be seen that the awning 3 is supported upon a roller 2 which may be, and preferably is, spring-actuated, and the free edge of the awning is secured to the cross bar of a stretcher frame 16. The roller is supported in the out-turned ends or brackets 31 of a cross bar 30 that is non-extensible so that the brackets for the roller are at a fixed distance apart. To this bar, and near its ends, are pivoted two supporting frame pieces 32. 33 indicates plates, carried by the frame pieces 32, adapted to be forced into the glass runs in a window frame the same as are the flanges 7 of the supporting frames 6 already described. A cross bar 34 unites the opposite supporting frame pieces 32, being pivotally united thereto at 36, 36. The cross bar is formed of two pieces so as to be extensible and these two parts are united by a turn buckle 35. This permits the supporting frame pieces to be moved toward each other to allow the flanges or plates 33 to enter the glass runways a and then to be forced apart to clamp against the window frame, the frame pieces 32 being provided with outwardly extended or exposed plates 40. The lower or free ends of the side arms of the stretcher frame are bent to form pivots 37 that lie in bearing loops 38 formed at the lower ends of the frame pieces 32, these being formed by folding the end portions of the frames back upon themselves and securing them by screws and clamp nuts 39.

The supporting frame pieces 32 carry rigid upright 41 and to these is connected the cross bar 30, by means of bolts and nuts 43, the former passing through slots 42 formed in the bar 30. This arrangement permits the supporting side frames to be bodily moved laterally relative to the cross bar as such frames are being adjusted to support the awning in the window frame, to permit its removal. The bolts also serve as pivotal connections between the supporting frames 32 and the cross bar, allowing angular adjustment of these parts as may be required.

The awning last described may be set in place, removed, and operated the same as the awning first described.

What I claim is:

1. An awning for vehicles and the like having a frame fixed as to its length, a roller supported therein, a curtain or awning wound upon the roller, a supporting frame consisting of two parts connected with the ends of the first mentioned frame, such parts being adapted to engage respectively with the runways of a window frame, and means for moving the said parts of the supporting frame either toward or from each other to permit the awning to be removed from or secured in a window opening.

2. An awning such as described in claim 1 having the two parts of the supporting frame pivotally connected with the roller frame.

3. In an awning for vehicles, a roller, an awning fabric wound thereon, a supporting frame for the roller comprising a cross bar carrying resilient brackets near its ends in which the roller is supported for rotation, supporting frame pieces connected with the roller frame adapted to engage the framework surrounding a window opening, means for forcing the supporting pieces apart and into engagement with the framework of the window, and a spreader frame to which the free edge of the awning fabric is secured, pivotally connected with the supporting frame pieces.

4. In an awning for vehicles, a roller, an awning fabric wound thereon, a supporting frame for the roller comprising a transverse bar tubular at its ends and roller carrying brackets thereon, studs extending beyond the cross bar and having their inner ends enter the tubular portions of the cross bar of the roller frame, means for adjusting the studs in the tubular parts of the cross bar, means adapted to engage with the framework of a window opening and to be held in engagement therewith as the studs are moved outwardly to support the awning, and means for holding the awning fabric in a more or less extended position as desired.

5. An awning such as described in claim 16 in which the studs therein specified are screw-threaded and the adjusting means that cause the studs to be moved are nuts in engagement with the screw-threaded portions of the studs and bearing against the ends of the crosshead of the roller frame.

HAROLD E. WILLIAMS.